United States Patent
Ayoub

(10) Patent No.: US 7,568,717 B2
(45) Date of Patent: Aug. 4, 2009

(54) TOW COUPLING SYSTEM AND METHOD

(76) Inventor: Ihab Ayoub, 2210 W. Dallas St., No. 1632, Houston, TX (US) 77019

( * ) Notice: Subject to any disclaimer, the term of this patent is extended or adjusted under 35 U.S.C. 154(b) by 32 days.

(21) Appl. No.: 11/671,456

(22) Filed: Feb. 5, 2007

(65) Prior Publication Data

US 2007/0182127 A1 Aug. 9, 2007

Related U.S. Application Data

(60) Provisional application No. 60/766,674, filed on Feb. 4, 2006.

(51) Int. Cl.
*B60D 1/06* (2006.01)
*B60D 1/36* (2006.01)

(52) U.S. Cl. .................. 280/477; 280/475; 280/511; 280/766.1

(58) Field of Classification Search .............. 280/477, 280/475, 429, 431, 507, 511–512, 766.1, 280/432
See application file for complete search history.

(56) References Cited

U.S. PATENT DOCUMENTS

| 3,418,628 | A | * | 12/1968 | Fenner | 340/431 |
| 3,773,356 | A | * | 11/1973 | Eichels et al. | 280/477 |
| 3,773,358 | A | * | 11/1973 | Butler et al. | 280/513 |
| 4,253,680 | A | * | 3/1981 | Albright et al. | 280/479.1 |
| 4,291,893 | A | * | 9/1981 | Hansen | 280/507 |
| 4,657,275 | A | * | 4/1987 | Carroll | 280/477 |
| 4,781,394 | A | * | 11/1988 | Schwarz et al. | 280/477 |
| 4,854,604 | A | * | 8/1989 | Stallsworth | 280/477 |
| 5,335,930 | A | * | 8/1994 | Tighe | 280/477 |
| 5,516,139 | A | * | 5/1996 | Woods | 280/477 |
| 5,697,630 | A | * | 12/1997 | Thompson et al. | 280/477 |
| 5,882,029 | A | * | 3/1999 | Kennedy | 280/477 |
| 6,382,653 | B1 | * | 5/2002 | Bass | 280/477 |
| 2003/0189313 | A1 | * | 10/2003 | Sievers | 280/507 |

* cited by examiner

*Primary Examiner*—Anne Marie M. Boehler
(74) *Attorney, Agent, or Firm*—Ahab S. Ayoub

(57) ABSTRACT

Variations of a tow coupling system are disclosed. In one variation, a coupler guide having at least one side panel configured to guide a coupler to a desired position with respect to a ball of a tow vehicle, also includes a top panel, rear panel, or intermediate panel. In one variation, the tow coupling system includes a coupler guide having at least one side panel which is configured such that a bottom side thereof will be positioned above an operatively connected ball. In one variation, the tow system includes an apparatus for operatively connecting a coupler to a ball of a tow vehicle, including a rod which is operatively connected to both the coupler and a vertical adjustment device which acts upon the rod to raise and lower the coupler. A tow coupling kit including both a coupler guide and an apparatus for connecting to a ball of a tow vehicle is also disclosed, as is a method of manufacturing a tow coupling system.

8 Claims, 3 Drawing Sheets

TOW COUPLING SYSTEM AND METHOD

CROSS-REFERENCE TO RELATED APPLICATIONS

This application claims priority to U.S. Provisional Patent Application No. 60/766,674, "TOW COUPLING SYSTEM AND METHOD" filed on Feb. 4, 2006, and hereby incorporated by reference.

BACKGROUND OF INVENTION

1. Field of the Invention

The invention relates generally to a coupling system for operatively connecting two or more vehicles.

2. Background Art

Tow coupling systems, particularly those used with passenger vehicles to tow a trailer, typically comprise a ball operatively connected to one vehicle (usually the towing vehicle) and a cup for connecting to the ball, which is typically attached to a tow bar of the towed vehicle (e.g., trailer). In use, such systems typically require an operator to move the tow vehicle in such a manner that a ball thereof (or other mating component) is close to an estimated location of the cup (or other mating component) of the vehicle to be towed. Such systems then require that the operator then secure the towing vehicle, exit the vehicle, and physically connect the towing vehicle to the towed vehicle using the tow coupling system.

Traditional systems, as described above, pose a number of difficulties for an operator, including requiring the operator to exit the vehicle, creating a potentially dangerous situation, and the physical manipulation of the towed vehicle in forming the connection, which may require significant physical effort on the part of the operator. Furthermore, because such systems are most effective when the two vehicles are properly disposed with respect to one another, damage may occur from unintended contact between the vehicles, as an operator attempts to align the two vehicles. Accordingly, there exists a need for an improved tow coupling system.

SUMMARY OF INVENTION

In one embodiment, the invention comprises a coupler guide, including at least one side panel configured to guide a coupler to a desired position with respect to a ball, and at least one additional panel selected from a top, rear, or intermediate panel. One or more of the panels may be hinged and/or flexible, and the guide may comprise a single unitary body, and/or have an elliptical cross-section that will advantageously 'funnel' or otherwise guide a coupler to a desired position. A base member may also be included, and the coupler guide may be configured to pivot.

In one embodiment, the invention comprises a coupler guide having at least one side panel that is configured such that a portion of a bottom portion thereof will be disposed above an operatively connected ball. Such a configuration advantageously allows for a more precise guiding of a coupler to a desired position over a ball, while minimizing interference with any lateral movement of the coupler and attached components.

In one embodiment, the invention comprises a coupler and vertical adjustment device (VAD), both operatively connected to a rod. The VAD may be activated in a number of ways, and functions to extend and retract the rod, relative to the coupler, such that the distance between the coupler and a supporting surface, such as the ground, may be varied. A switch may be included to activate the VAD, and the switch may be triggered in any manner, including a predetermined interaction with a coupler guide. Such embodiments advantageously facilitate and automate aspects of the process of coupling a coupler with a ball.

Other aspects and advantages of the invention will be apparent from the following description and the appended claims.

DETAILED DESCRIPTION

As used herein, the term "coupler" means any device operatively connected to an object to be towed, and configured to operatively connect to a ball or other device disposed on and/or operatively connected (or connectable) to a tow vehicle such that the tow vehicle will be operatively connected to the object to be towed. A coupler may be of any type known in the art, including but not limited to, a trailer tongue and various components thereof, such as a ball cup.

Figure 1:
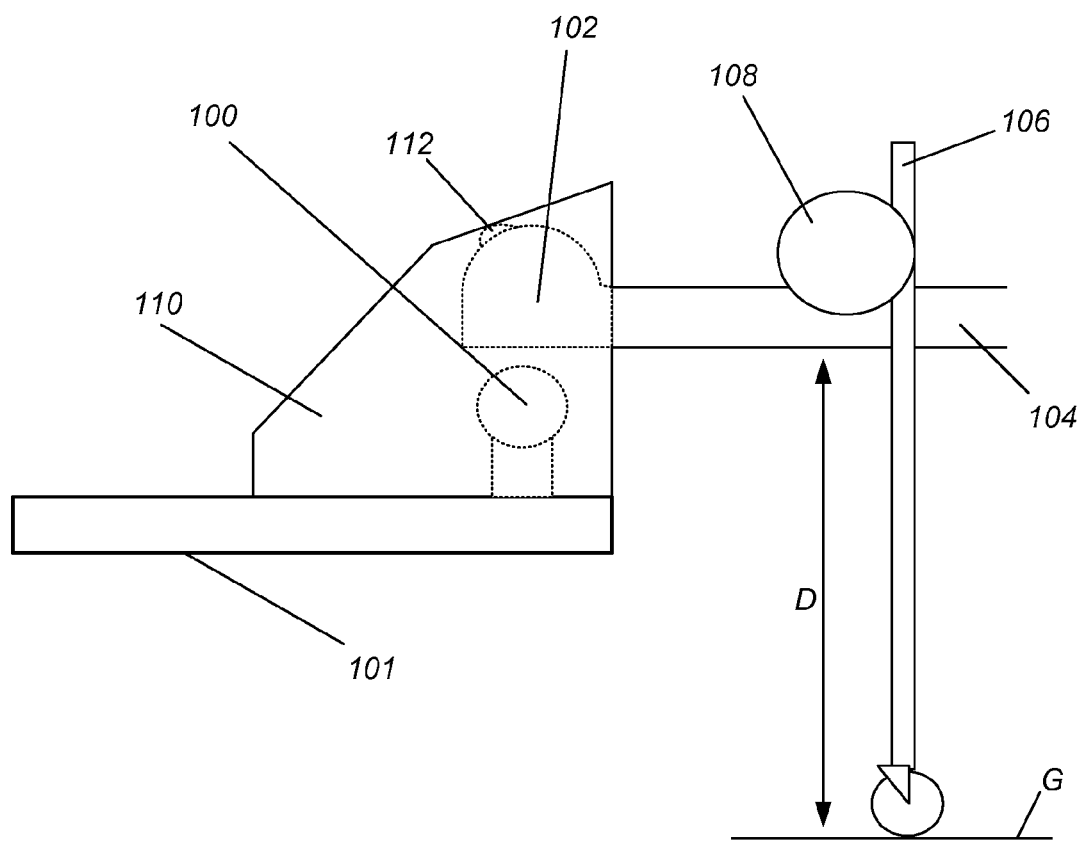
FIG. 1 shows one embodiment of a coupler and a coupler guide.

As shown in FIG. 1, in one embodiment the invention comprises a coupler assembly on a vehicle to be towed (hereinafter "trailer"), including a coupler 102 operatively connected to the trailer (connection represented at 104), and a rod 106 operatively connected to the coupler 102 such that the rod 106 may be extended and retracted (relative to the operative connection 104) using a vertical adjustment device ("VAD") 108. The VAD 108, when activated, will increase and/or decrease the distance D between the coupler 102 and the ground G. Other configurations known in the art for providing at least partial support to a trailer may be substituted for the rod 106 and acted upon by the VAD 108 to effect a change in the distance D between the coupler 102 and the ground G.

In use, activation of a switch 112 operatively connected to the VAD 108 will result in a lowering of the coupler 102. The operative connection between switch 112 and VAD 108 may be mechanical, electrical, wireless and/or any combination thereof. The VAD 108 may also be configured to raise the coupler 102 when desired. Furthermore, the switch 112 need not be activated physically, but may instead be electronically activated, for example remotely by an operator, or due to proximity to a second element. In embodiments where the switch 112 does not require physical activation, the switch 112 need not protrude or otherwise form a physically-displaceable member. Furthermore, the switch 112 may be disposed anywhere on the trailer and/or tow vehicle (including integration into the VAD 108), depending on the characteristics and/or configuration of a particular embodiment.

Once activated, the VAD 108 acts upon the rod 106 to lower the coupler 102 onto the ball 100. Once the coupler 102 has been lowered onto the ball 100, the VAD 108 may continue to act upon the rod 106 so that the rod 106 is raised to a desired level such that there is a desired distance between the lower end of the rod 106 (including any components attached thereto, such as wheels), and the ground G.

The VAD 108 may also act upon the rod 106 until the rod 106 is completely raised, or raised to a predetermined height, and may also act upon the rod 106 until the rod 106 is extended such that a predetermined distance D is achieved and/or a predetermined load is supported by the rod 106. Any approach known in the art may be used to determine and/or set the range of movement of the rod 106. In one embodiment, the VAD 108 will be set to repeatedly effect a predetermined range of movement of the rod 106. In one embodiment, each activation of the switch 112 will cause an alternating activation of the VAD 108 (e.g., a first activation results in a raising of the rod 106 and a second activation results in a lowering of the rod 106).

The VAD 108 may comprise any mechanism or combination of mechanisms known in the art that is able to act upon the rod 106 such that the distance D may be adjusted. Such mechanisms include, but are not limited to, one or more motors. The VAD 108 and/or rod 106 may be of any configuration known in the art, and furthermore may be configured to facilitate a desired interaction therebetween. The VAD 108 may be powered by any means known in the art.

Figure 2:
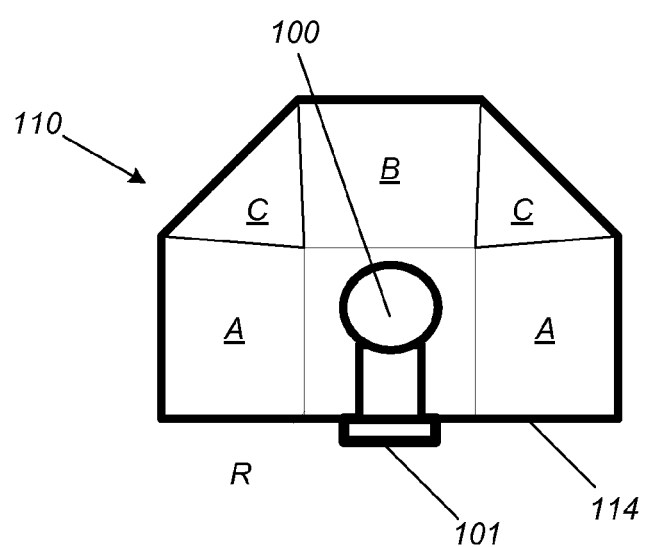
FIG. 2 shows one embodiment of a coupler guide.

As shown in FIGS. 1-2, in one embodiment, the invention comprises a coupler guide 110 configured to align a coupler 102 over a ball 100 operatively connected to a tow vehicle (not shown). The coupler guide 110 may also be configured to activate a switch 112. The operative connection of the ball 100 to the tow vehicle may utilize a drawbar 101, may be through direct connection to a bumper of the tow vehicle, or may comprise any other configuration known in the art. Although various novel embodiments of coupler assemblies are disclosed herein, embodiments of the coupler guide 110 may also be used to align traditional coupler configurations over a ball 100.

As shown in FIG. 2, in one embodiment, the coupler guide 110 may comprise a number of alignment elements. Such elements may include side members A and one or more top members B. The side members A and top member B may be connected by intermediate members C which may also play a role in alignment of the coupler 102, and/or may help prevent penetration of outside elements (water, dust, etc.) into the coupler guide 110. The side members A will be angled to align the coupler 102 over the ball 100 and the top member B, if present, may have a sloped orientation so that a switch 112 disposed on a coupler 102 will contact the top member B once the coupler 102 is in a predetermined position with respect to the ball 100. A rear member R may also be included, and may function as a barrier to outside elements and/or to prevent over-shooting of the ball 100 by the coupler 102, thereby advantageously preventing damage to the tow vehicle. Although described as separate members herein, various elements of the coupler guide 110 may be configured as a single unitary body, so long as a desired functionality is maintained.

The coupler guide 110 may also comprise a base member 114 for operatively connecting the coupler guide 110 to the tow vehicle, drawbar 101, and/or ball 100. The base member 114 may be of any configuration, including but not limited to, the width of the coupler guide 110, or a width just sufficient to form a desired operative connection. Members A,B,C, and R may each be of any desired size, shape, orientation, and/or configuration known in the art, and may be operatively connected to each other by any means known in the art. Furthermore, any combination of members may be formed as a unitary body. The coupler guide 110 may operatively connect to the tow vehicle by any means known in the art.

Figure 3:
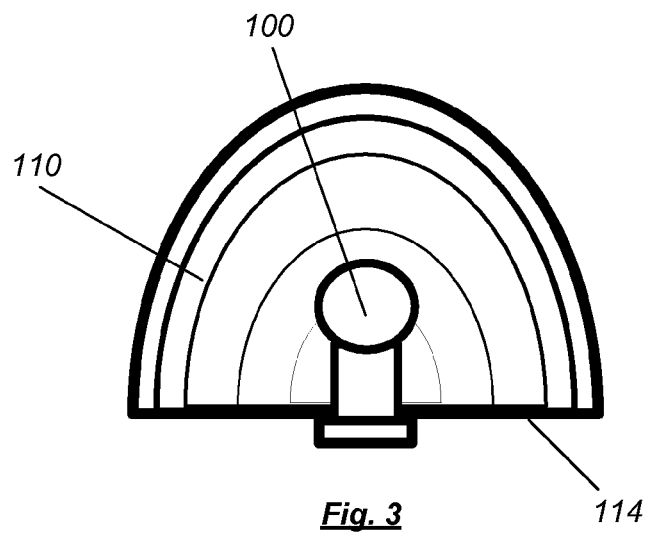
FIG. 3 shows one embodiment of a coupler guide.

As shown in FIG. 3, one embodiment of the coupler guide 110 may be configured to have an elliptical cross-section. Such a configuration may advantageously "funnel" the coupler 102 into the coupler guide 110 until a predetermined placement is achieved, and/or contact is made between a switch 112 disposed on the coupler 102 and an interior surface of the coupler guide 110. Such a configuration may also include a base member 114. The coupler guide 110 may also have any other desired configuration sufficient to guide a coupler 102 to a desired position and/or activate a switch 112.

Figure 4:
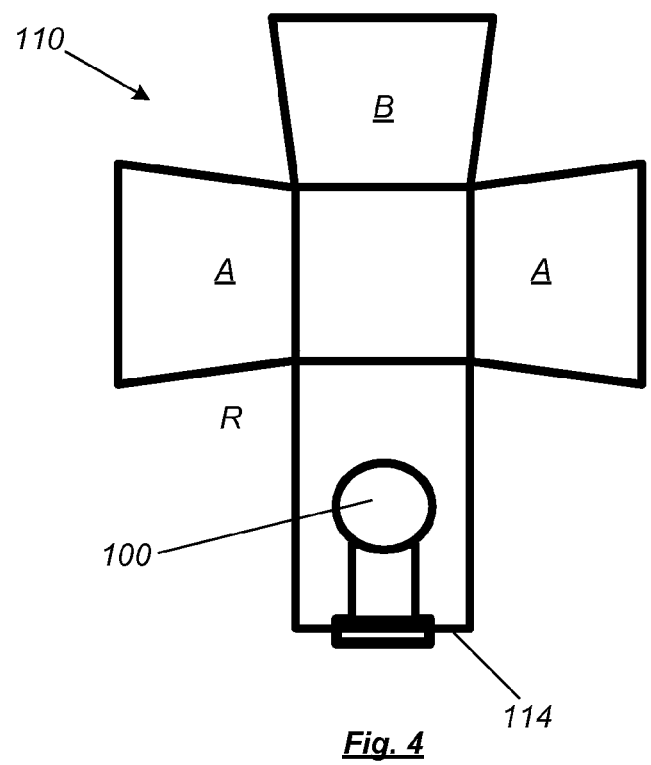
FIG. 4 shows one embodiment of a coupler guide.

As shown in FIG. 4, in one embodiment the coupler guide 110 comprises a plurality of side members A which may operatively connect to a rear member R, or may operatively connect directly to each other (forming a "V", "U" or any other guiding shape when viewed from above). The coupler guide 110 may also include at least one top member B. When used with embodiments of a coupler assembly as described herein, the top member B may function to activate a switch 112 operatively connected to a coupler 102. The embodiment of FIG. 4 is also advantageously configured such that the side members A used to guide the coupler 102 are disposed a sufficient distance above the ball 100 so that once the coupler 102 is operatively connected to the ball 100, the coupler 102 will be disposed below the side members A, advantageously allowing the coupler an unobstructed lateral movement when operatively connected to the ball 100. This permits a more precise guiding of the coupler 102 due to a potentially narrower angle of the side members A without sacrificing lateral mobility when the coupler 102 is operatively connected to the ball 100.

Figure 5:
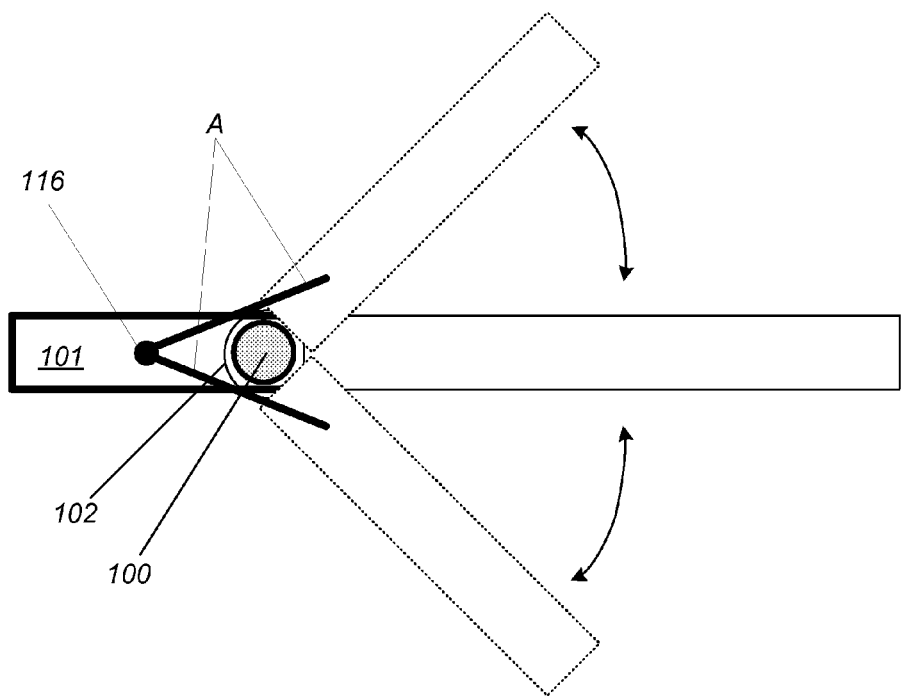
FIG. 5 is a top-down view of one embodiment of a coupler guide.

As shown in the top-down view of FIG. 5, in one embodiment the raised placement of the side members A, as previously discussed, will advantageously permit increased freedom of lateral movement of the coupler 102 and trailer, once the coupler 102 is lowered onto the ball 100. As shown, the coupler 102 and its operative connection to the trailer may freely rotate about the ball 100 without obstruction by the raised side members A. Furthermore, the coupler guide 110 may be operatively connected to the tow vehicle and/or a drawbar 101 thereof by any means known in the art. In one embodiment, the operative connection between coupler guide 110 and tow vehicle may comprise a pivot 116 or similar mechanism which will permit a desired rotation of the coupler guide 110. In one embodiment, such a pivot 116 will be biased to align the coupler guide 110 over the ball 100, thereby advantageously aligning it with the coupler 102 and more effectively aligning the coupler 102 with the ball 100.

Figure 6:
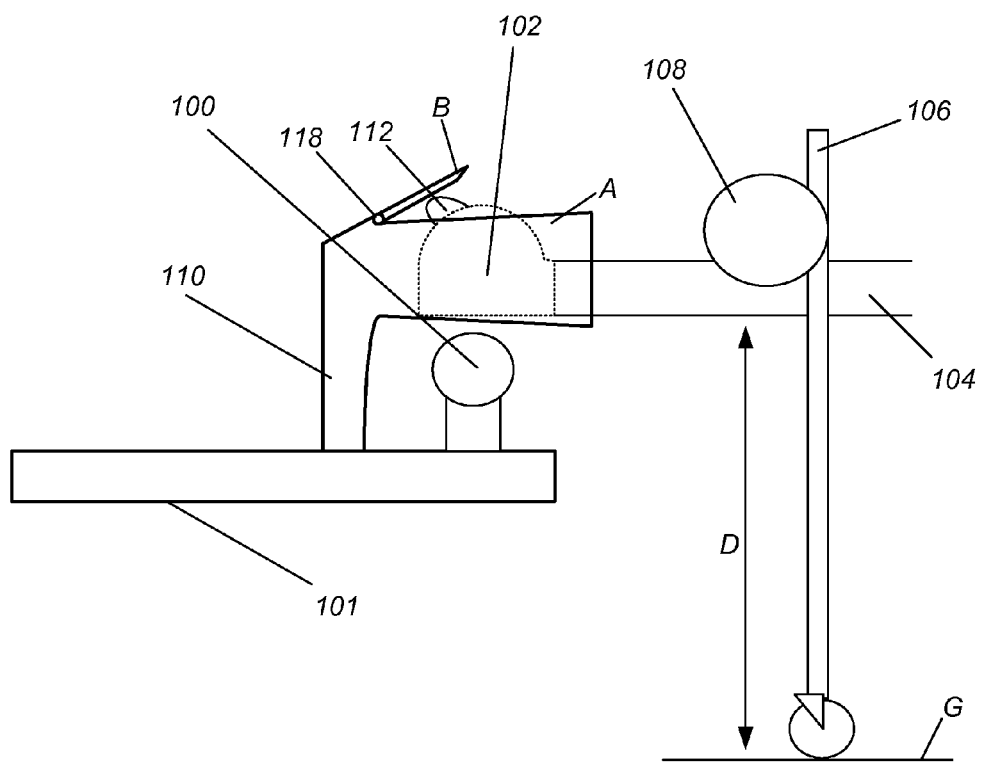
FIG. 6 shows one embodiment of a coupler and a coupler guide.

As shown in the embodiment of FIG. 6, the coupler guide 110 may comprise two or more side panels A (possibly formed as a unitary body), and may also include a top panel B. The operative connection of the top panel B may optionally include a hinge element 118 to advantageously permit pivoting of the top panel B. Pivoting may allow the top panel B to be displaced or flex when contacted by the coupler 102, and may also allow the top panel B to pivot downwardly such that the coupler 102 will be prevented from disconnecting from the ball 100, once the two are operatively connected. The hinge element 118 may be of any type known in the art, and may be lockable, releasable, and/or resettable, based upon various factors and/or operative interaction/initiation. Once the coupler 102 is operatively connected to the ball 100, the coupler 102 will be disposed such that it is positioned below the two or more side panels A, thereby advantageously permitting greater freedom of lateral movement of the coupler 102 and trailer, while permitting a narrower and more precise configuration of the guide elements of the coupler guide 110.

As previously discussed, the coupler guide 110 may also be configured to have a desired range of pivot when operatively connected to the ball 100 (e.g., through a drawbar 101 or bumper). Furthermore, although the embodiment of FIG. 6 is shown with a VAD 108, such an embodiment may be used with any suitable configuration of coupler 102 and/or trailer. As previously discussed, in certain embodiments, a physical switch 112 is optional, and the VAD 108 may be activated remotely, based on certain interactions with one or more guide elements (e.g., A, B), manually, and/or by any other means known in the art.

In one embodiment, one or more of the alignment elements (e.g., A, B, C, and/or R) may be configured to flex and/or may include a flexible operative connection to the coupler guide 110. Such configurations advantageously are more resistant to damage due to interactions with the coupler 102 and may also be more effective in aligning the coupler 102 with the ball 100. Such embodiments may also be utilized with a self-powered and/or self-steering trailer, which may be configured to move and/or align itself based on feedback initiated by contact with one or more members of the coupler guide 110 or a predetermined proximity thereto. The mechanism by which such a trailer would be motorized and/or steered may be of any type known in the art.

In one embodiment, contact with a member (A and/or B) of the coupler guide 110 may initiate movement of any one or more members (A and/or B) thereby further guiding the coupler 102 into proper alignment with the ball 100 and/or locking the coupler 102 once it is operatively connected to the ball. For example, in one embodiment, a predetermined contact with a member of the coupler guide 110 will result in a lowering of the top member B such that it will prevent the coupler 102 from rising off of the ball 100 once the two are operatively connected. In one embodiment, a predetermined contact with a member of the coupler guide 110 will result in an inward displacement of at least one side member A such that the side member A will be positioned over the ball 100 and thereby prevent decoupling of the coupler 102 and ball 100. The mechanisms by which these functions occur may be of any type known in the art, and may also include a delay feature in order to permit sufficient lowering of the coupler 102 by the VAD 108 prior to movement of the target member.

Furthermore, where one or more members (A and/or B) are moveable and/or flexible, such movement and/or flexion may be utilized to trigger a switch 112 which will activate the VAD 108 to initiate a raising or lowering of the coupler 102. For instance, contact with such a member will initiate a predetermined movement which will result in activation of the switch 112, which may be disposed in any suitable location. Alternatively, any activation of the VAD 108 may be operator-initiated and/or remotely controlled.

The various elements described herein may be of any type, shape, size, and/or configuration known in the art. Furthermore, the various elements described herein may comprise any material and/or combination of materials known in the art. In one embodiment, the guide elements as described herein may be non-planar and may also be configured to each include a plurality of planar surfaces of varying orientations.

Although described with reference to a tow vehicle and trailer, the embodiments described herein may be used to operatively connect any two objects, including but not limited to the cars of a train, and/or with any marine or airborne objects. Where the two objects to be operatively connected may be subject to differing forces and/or orientations (e.g., as may occur between two or more water-borne objects), it may be desirable to include one or more additional pivot and/or flexion interfaces in the coupler assembly or somewhere along the operative connection between the coupler assembly and an operatively connected object.

In one embodiment, the invention comprises a method of manufacturing a coupler guide 110. The method comprises operatively connecting a plurality of side panels A such that they are configured to guide a coupler 102 to a predetermined position. In one embodiment, the method comprises configuring at least one element of the coupler guide 110 according to any of the configurations described herein.

In one embodiment, the coupler guide 110 may be configured to operatively connect to a ball 100 separately from a tow vehicle, such that the combination coupler guide 110 and ball 100 may be (permanently or reversibly) operatively connected to the tow vehicle as a single apparatus.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A tow-coupling system, comprising:
   a coupler guide configured to operatively connect to a tow vehicle, the coupler guide comprising (a) at least one side panel configured to guide a coupler to a desired position with respect to a ball, and (b) a top panel configured to exert a lowering force on the coupler as the coupler enters the coupler guide, the coupler configured to connect to a trailer, and comprising at least one switch oriented such that the switch will contact the coupler guide when the coupler and coupler guide are in a predetermined proximity;
   a rod operatively connected to the coupler and to a vertical adjustment device, the vertical adjustment device configured to move the rod in at least one selected from an upward direction, and a downward direction, relative to the coupler; and
   an operative connection between the at least one switch and the vertical adjustment device, such that a predetermined contact between the at least one switch and the coupler guide will result in activation of the vertical adjustment device.

2. The tow-coupling system of claim 1, wherein the at least one side panel and the top panel are formed as a single unitary body.

3. The tow-coupling system of claim 2, wherein the unitary body has a concave inner surface.

4. The tow-coupling system of claim 1, wherein the coupler guide is configured to operatively connect to the ball such that the coupler guide may pivot in at least one axis.

5. The tow-coupling system of claim 1, further comprising a base member.

6. The tow-coupling system of claim 1, wherein the vertical adjustment device is configured to move the rod within a predetermined range upon activation of the vertical adjustment device.

7. The tow-coupling system of claim 1, further comprising at least one selected from an automated steering system and a movement actuator.

8. The tow-coupling system of claim 1, wherein the at least one switch is remotely operable by a user.

* * * * *